United States Patent
Horng et al.

(10) Patent No.: US 7,273,400 B2
(45) Date of Patent: Sep. 25, 2007

(54) WIRE FIXING DEVICE FOR FAN

(75) Inventors: Alex Horng, Kaohsiung (TW);
Mei-Chih Fang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 11/484,570

(22) Filed: Jul. 12, 2006

(65) Prior Publication Data

US 2007/0117465 A1    May 24, 2007

(30) Foreign Application Priority Data

Nov. 22, 2005    (TW) .............................. 94140999 A

(51) Int. Cl.
*H01R 24/00* (2006.01)

(52) U.S. Cl. ...................... 439/660; 439/502; 439/577

(58) Field of Classification Search ................ 439/577, 439/502, 506, 527, 660
See application file for complete search history.

(56) References Cited

U.S. PATENT DOCUMENTS 4,160,576 A * 7/1979 Vettori ........................ 439/191
6,388,196 B1   5/2002 Liu et al.
6,431,910 B1 * 8/2002 Chuang et al. .............. 439/577
2003/0189381 A1  10/2003 Reddy

* cited by examiner

*Primary Examiner*—Truc Nguyen
(74) *Attorney, Agent, or Firm*—Birch, Stewart, Kolasch & Birch, LLP

(57) ABSTRACT

A wire-fixing device is provided for a fan including a casing having a wire groove defined in an outer side of the casing. The wire-fixing device includes a retaining groove and a substantially L-shaped resilient retaining member. The retaining groove is defined in an outer corner of the casing and adjacent to the wire groove. The retaining groove includes a first coupling groove and a second coupling groove respectively on two sides of the wire groove. The retaining member has an angle smaller than that of the outer corner of the casing. The retaining member includes two arms each having a distal end. A first coupling section and a second coupling section are respectively formed on the distal ends of the arms and extend inward toward each other. The first coupling section and the second coupling sections are respectively engaged in the first coupling groove and the second coupling groove.

9 Claims, 7 Drawing Sheets

WIRE FIXING DEVICE FOR FAN

BACKGROUND OF THE INVENTION

1. Field of the Invention

The present invention relates to a wire fixing device for a fan. More particularly, the present invention relates to a wire fixing device for a fan that allows rapid, convenient assembly and that avoids escape of wires and breakage in the welding points.

2. Description of Related Art

Referring to FIG. 1, a typical fan casing 10 includes two end faces. A compartment 11 is defined in one of end faces for receiving an impeller. A base 12 and a plurality of stator blades 13 are provided on the other end face. A driving device is mounted on the base 12 for driving the impeller to turn.

A wire groove 20 is defined in an outer wall of the fan casing 10 and extends through upper and lower end faces of the fan casing 10. A limiting section 21 is defined in each end of the wire groove 20 and includes a slot 22. A wire outlet 23 is defined in, e.g., the upper end of the wire groove 20 and in communication with the compartment 11.

Referring to FIG. 2, a plurality of wires 31 are welded to a circuit board 30 on the driving device and extend through the wire outlet 23 and then inserted via the slots 22 into the wire groove 20 one by one. The wires 31 are retained in the wire groove 20 by the limiting sections 21.

However, inserting of each wire 31 into the wire groove 20 is inconvenient and time-consuming. As illustrated in FIG. 2, when two fans casings 10 are coupled together and the wires 31 of the fans are led outward together, the number of the wires 31 may be up to eight. Namely, the insertion step must be repeated for eight times for arranging the wires 31.

Further, the wires 31 are still liable to escape out of the wire groove 20 via the slots 22 although the limiting sections 21 are provided. In a case that a great number of wires 31 are inserted into the wire groove 20, the wire 31 adjacent to the slots 22 is liable to escape via the slots 22 due to vibrations generated during operation of the fans.

Further, referring to FIG. 2, the lower wires 31 extends horizontally from the wire outlet 23 of the lower fan casing 10, yet the upper wires 31 extending downward in an inclined angle from the upper fan casing 10 are not supported such that the welding points between the wires 31 and the circuit board 30 are liable to break due to bending stress.

SUMMARY OF THE INVENTION

In accordance with the present invention, a wire-fixing device is provided for a fan including a casing having a wire groove defined in an outer side of the casing. The wire-fixing device comprises a retaining groove and a resilient retaining member. The retaining groove is defined in an outer corner of the casing and adjacent to the wire groove. The retaining groove includes a first coupling groove and a second coupling groove respectively on two sides of the wire groove.

The resilient retaining member is substantially L-shaped in section and has an angle smaller than that of the outer corner of the casing. The retaining member includes two arms each having a distal end. A first coupling section and a second coupling section are respectively formed on the distal ends of the arms and extend inward toward each other. The first coupling section and the second coupling sections are respectively engaged in the first coupling groove and the second coupling groove.

By such an arrangement, a single coupling operation is sufficient to retain all of the wires in the wire groove. The assembling is rapid and simple. The angle difference between the retaining member and the casing allows the retaining member to exert a reactive force for providing a clamping effect, thereby tightly engaging the retaining member in the retaining groove and avoiding escape of the wires.

Preferably, the retaining groove is recessed such that the retaining member is flush with an outer perimeter wall of the casing when the retaining member is mounted in the retaining groove.

Preferably, the retaining member is made of metal, high-molecular material or other resilient material.

Preferably, the first coupling section includes an upper end and a lower end each having a protrusion.

Preferably, the second coupling section includes an upper end and a lower end each having a protrusion.

Preferably, the second coupling section includes an extension extending inward from the distal end of the second coupling section.

In an example, the extension is planar.

In another example, the extension is arcuate.

Preferably, a wire outlet is defined in a wall defining the wire groove. The wire groove is not in communication with either one of two end faces of the casing. The wire outlet provides a support for the wires regardless of the outgoing direction of the wires. Breakage of the welding points between the wires and the circuit board resulting from bending stress is thus avoided.

Other objects, advantages and novel features of this invention will become more apparent from the following detailed description when taken in conjunction with the accompanying drawings.

DETAILED DESCRIPTION OF THE PREFERRED EMBODIMENTS

Preferred embodiments of the present invention are now to be described hereinafter in detail.

Figure 1:
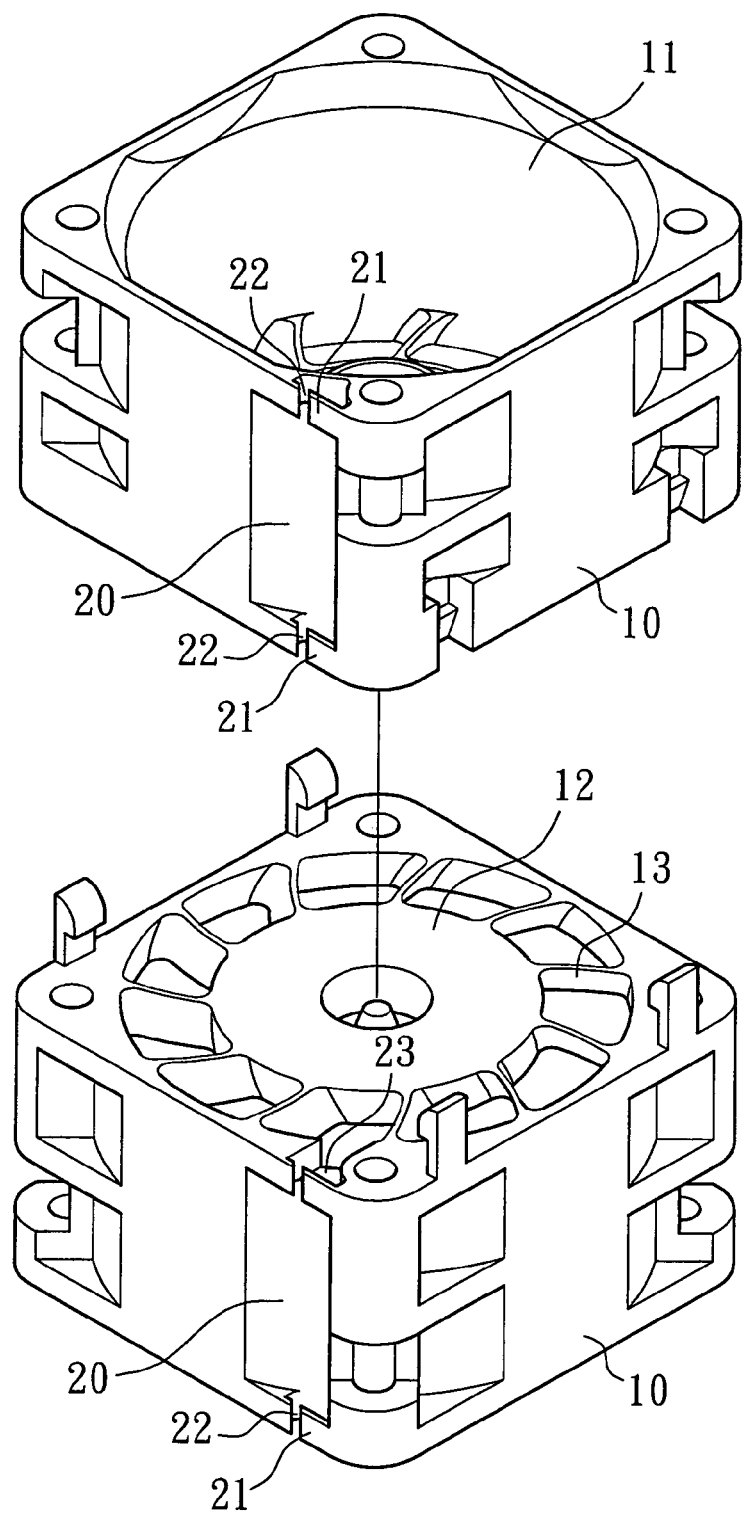
FIG. 1 is an exploded perspective view illustrating two fans each having a conventional wire-fixing device.
Figure 2:
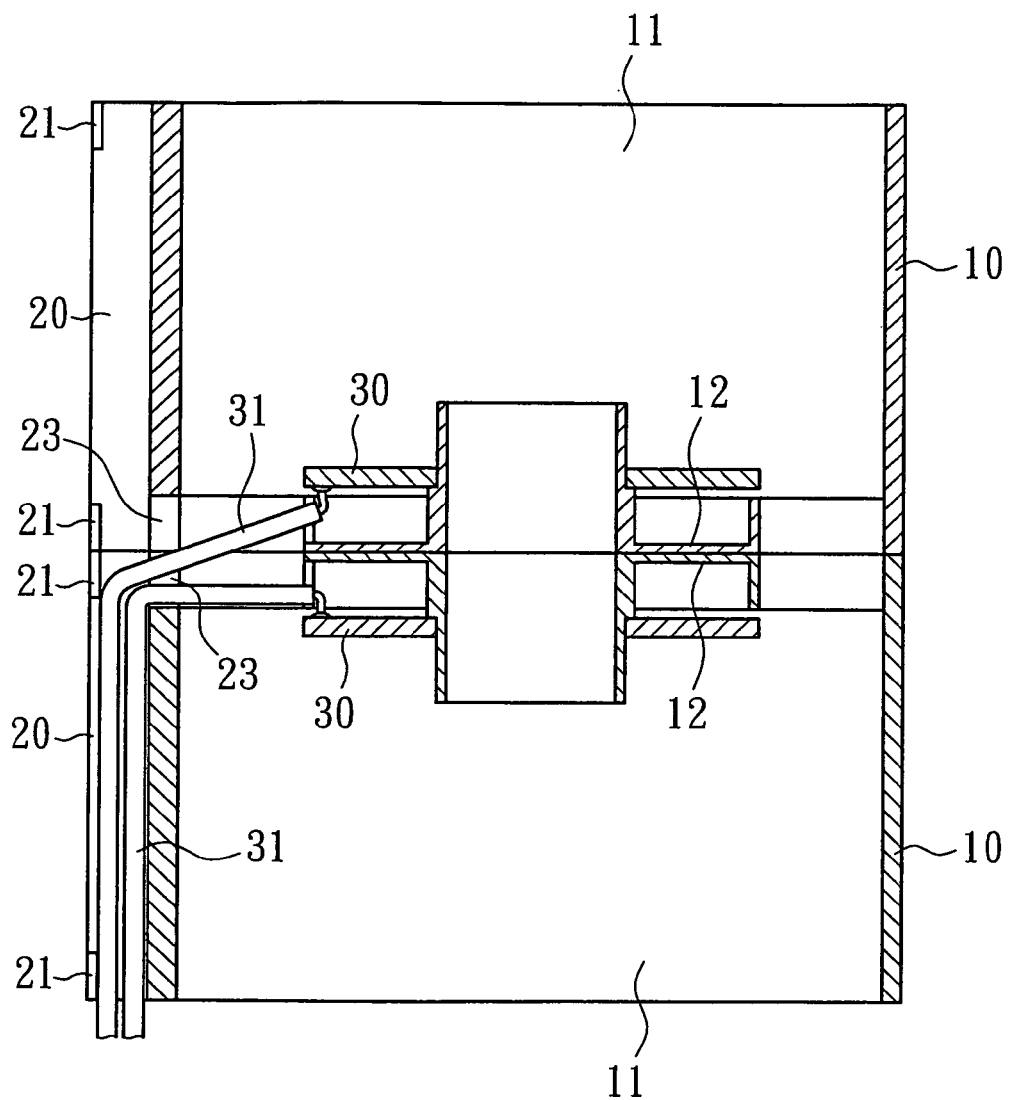
FIG. 2 is a sectional view of the fans in FIG. 1 after assembly.
Figure 3:
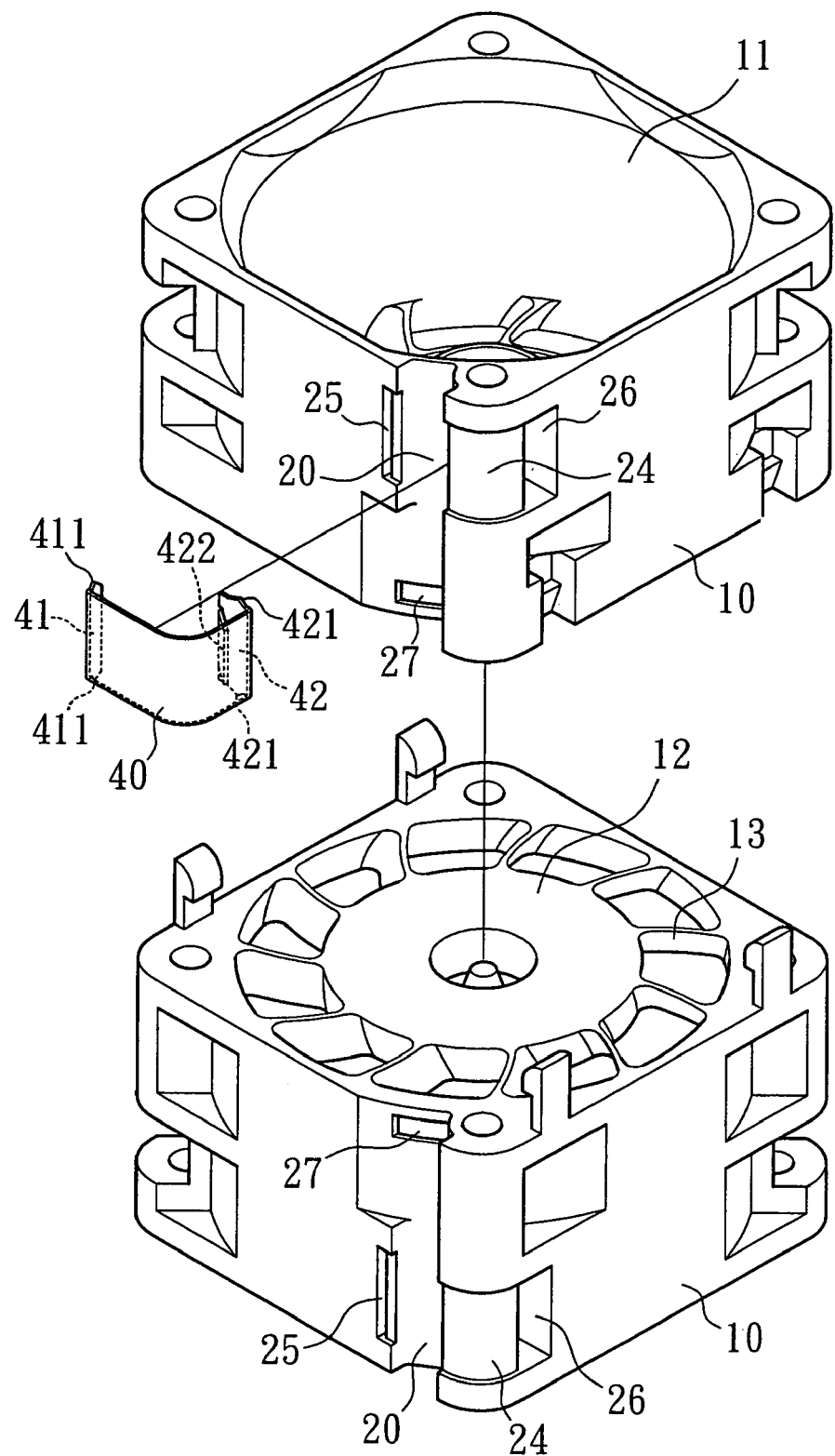
FIG. 3 is an exploded perspective view illustrating two fans and a first embodiment of a retaining member of a wire-fixing device in accordance with the present invention.

Referring to FIG. 3, a fan casing 10 includes two end faces. A compartment 11 is defined in one of end faces for receiving an impeller (not shown). A base 12 and a plurality of stator blades 13 are provided on the other end face. A driving device (not shown) is mounted on the base 12 for driving the impeller to turn. Further, a wire groove 20 is defined in an outer side of the fan casing 10 and extends through the upper and lower end faces of the fan casing 10. A wire outlet 27 is defined in a wall defining the wire groove 20 that is adjacent to the base 12. The wire outlet 27 is not in communication with either end face of the fan casing 10.

A wire-fixing device in accordance with the present invention comprises a retaining groove 24 and a retaining member 40. The retaining groove 24 is defined in an outer corner of the outer perimeter wall of the fan casing 10 and adjacent to the wire groove 20. The retaining groove 24 is recessed such that the retaining member 40 is flush with the outer perimeter wall of the fan casing 10 to constitute a partially outer surface thereof when the retaining member 40 is mounted in the retaining groove 24. The retaining groove 24 includes a first coupling groove 25 and a second coupling groove 26 that are respectively located on two sides of the wire groove 20.

The retaining member 40 is a resilient member that is substantially L-shaped in section and that is made of metal, high-molecular material, or other resilient material. The retaining member 40 includes two arms (not labeled). A first coupling section 41 is formed on a distal end of one of the arms and extends inward. A second coupling section 42 is formed on a distal end of the other arm and extends inward. Preferably, the first and second coupling sections 41 and 42 extend inward toward each other. Further, a protrusion 411, 421 is formed on each of an upper end and a lower end of each of the first and second coupling sections 41 and 42.

Figure 4:
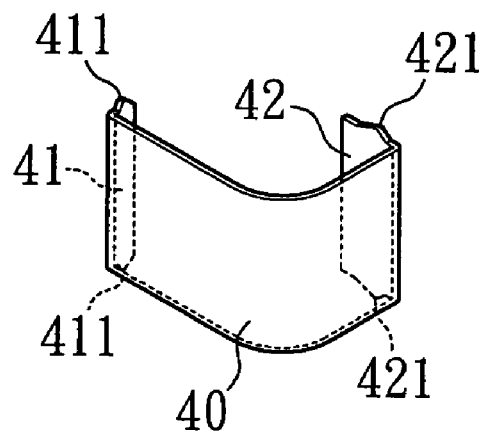
FIG. 4 is a perspective view illustrating a second embodiment of the retaining member in accordance with the present invention.

In the embodiment shown in FIG. 4, the second coupling section 42 is planar. Since the first and second coupling sections 41 and 42 extend inward toward each other, an inward clamping effect is provided. Thus, the retaining member 40 is securely coupled in the retaining groove 24.

In the embodiment shown in FIG. 3, a planar extension 422 extends inward from the distal end of the second coupling section 42 and forms an acute angle with the second coupling section 42. Hence, a resilient coupling effect is provided between the extension 422 and the second coupling groove 26. Thus, the engaging effect between the retaining member 40 and the retaining groove 24 is enhanced.

Figure 5:
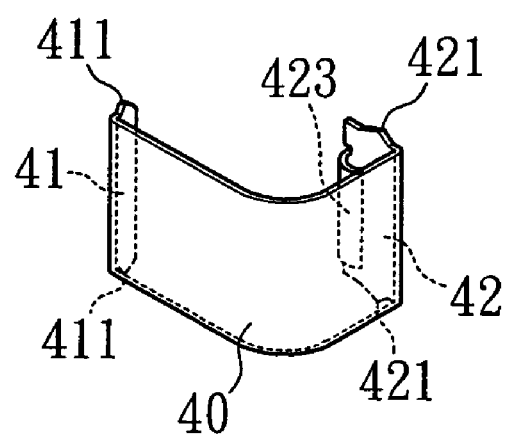
FIG. 5 is a perspective view illustrating a third embodiment of the retaining member in accordance with the present invention.

In the embodiment shown in FIG. 5, the extension (now designated by 423) is arcuate. Similarly, a resilient coupling effect is provided between the extension 423 and the second coupling groove 26. Thus, the engaging effect between the retaining member 40 and the retaining groove 24 is enhanced.

Figure 6:
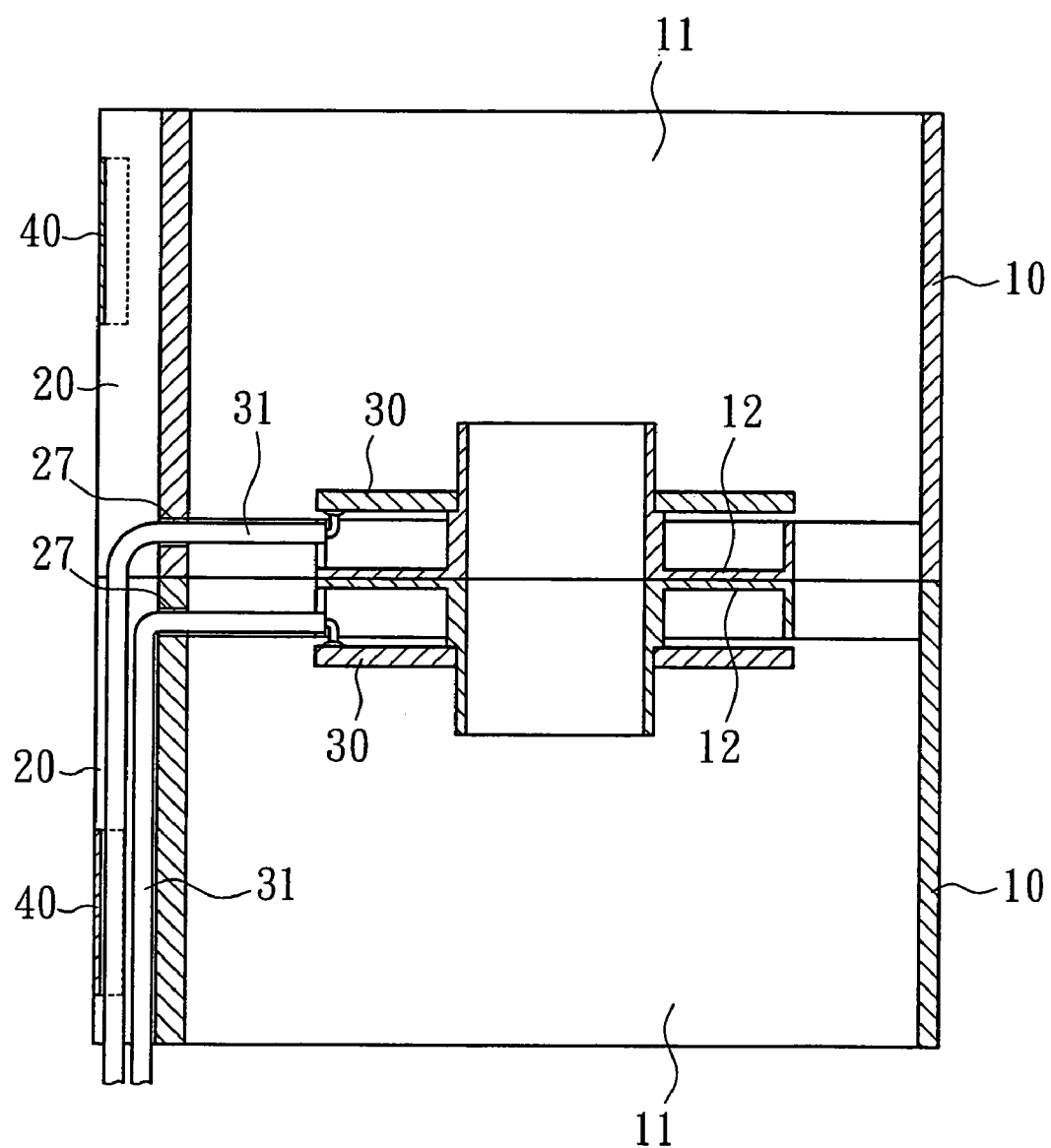
FIG. 6 is a sectional view of the fans in FIG. 3 after assembly.

Referring to FIG. 6, a plurality of wires 31 are welded to a circuit board 30 on the driving device. The wires 31 are extended through the wire outlet 27 and then placed into the wire groove 20 neatly.

Figure 7:
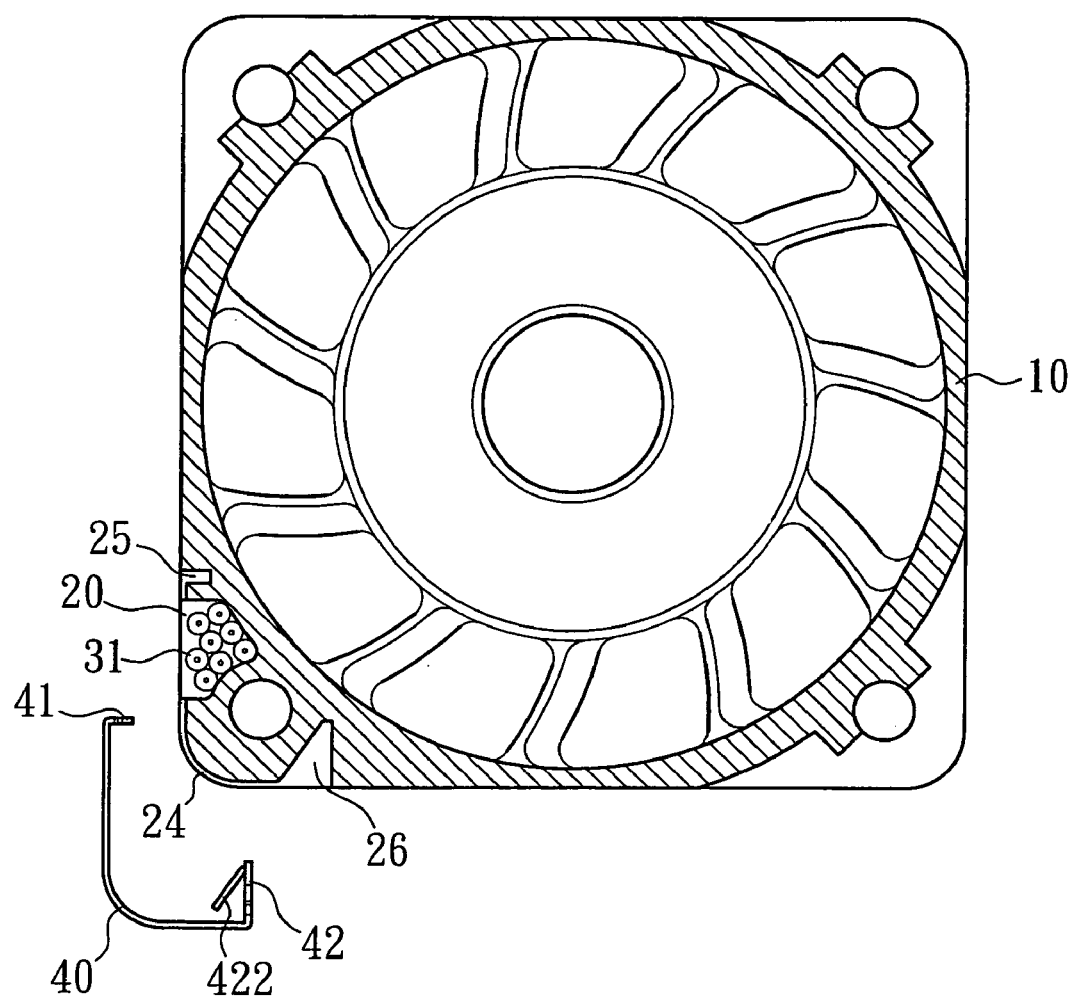
FIG. 7 is a sectional view, partly exploded, of a fan.
Figure 8:
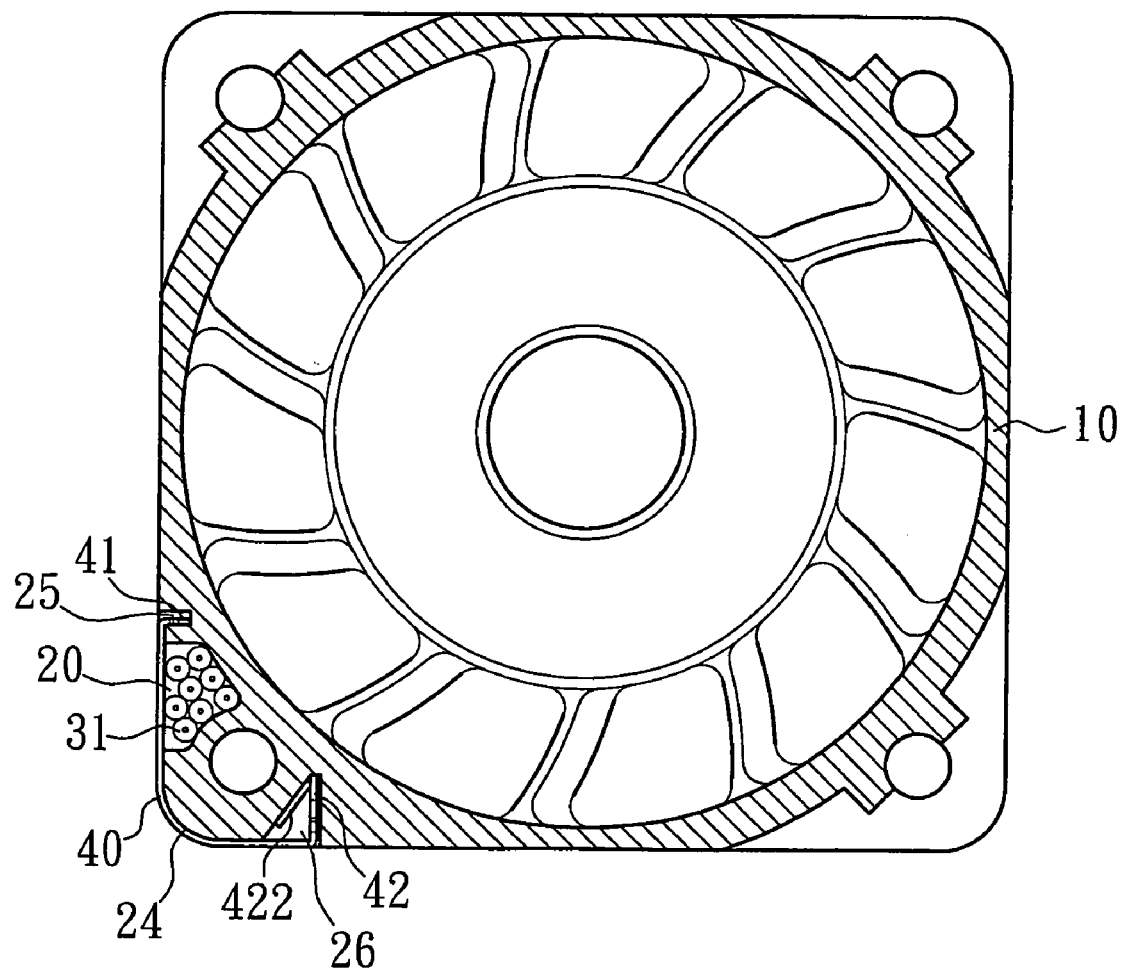
FIG. 8 is a sectional view similar to FIG. 7, wherein the retaining member has been assembled.

Referring to FIGS. 7 and 8, the retaining member 40 is mounted into the retaining groove 24 in which the first coupling section 41 is engaged with the first coupling groove 25 and the second coupling section 42 is engaged with the second coupling groove 26. Thus, the wires 31 are rapidly positioned in the wire groove 20 by the retaining member 40.

Preferably, the angle of the L-shaped retaining member 40 is smaller than that of the outer corner of the fan casing 10 in which the retaining groove 24 is formed. More preferably, the angle of the L-shaped retaining member 40 is smaller than that of the outer corner of the fan casing 10 by 7-10 degrees.

Thus, when the retaining member 40 is engaged into the retaining groove 24, due to the angle difference between the retaining member 40 and the outer corner of the fan casing 10, the retaining member 40 exerts a reactive force to provide a clamping effect such that the first and second coupling sections 41 and 42 tightly engage with the first and second coupling grooves 25 and 26. Accordingly, the first and second coupling sections 41 and 42 of the retaining member 40 are respectively in tight contact with the walls defining the first and second coupling grooves 25 and 26.

Since the wire outlet 27 is not in communication with either end face of the fan casing 10, the wire outlet 27 provides a support for the wires 31 regardless of the outgoing direction of the wires 31. Thus, the wires 31 extend outward away from the wire outlet 27 in a horizontal state. Breakage of the welding points between the wires 31 and the circuit board 30 resulting from bending stress is thus avoided.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A wire-fixing device for a fan, the fan including a casing, a wire groove being defined in an outer side of the casing, the wire-fixing device comprising:

a retaining groove defined in an outer corner of the casing and adjacent to the wire groove, the retaining groove including a first coupling groove and a second coupling groove respectively on two sides of the wire groove; and a resilient retaining member that is substantially L-shaped in section and that has an angle smaller than that of the outer corner of the casing, the retaining member including two arms each having a distal end, a first coupling section and a second coupling section being respectively formed on the distal ends of the arms and extending inward toward each other, the first coupling section and the second coupling sections being respectively engaged in the first coupling groove and the second coupling groove.

2. The wire-fixing device for a fan as claimed in claim 1, wherein the retaining groove is recessed such that the retaining member is flush with an outer perimeter wall of the casing when the retaining member is mounted in the retaining groove.

3. The wire-fixing device for a fan as claimed in claim 1, wherein the retaining member is made of metal or high-molecular material.

4. The wire-fixing device for a fan as claimed in claim 1, wherein the first coupling section includes an upper end and a lower end, each of the upper end and the lower end having a protrusion.

5. The wire-fixing device for a fan as claimed in claim 1, wherein the second coupling section includes an upper end and a lower end, each of the upper end and the lower end having a protrusion.

6. The wire-fixing device for a fan as claimed in claim 1, wherein the second coupling section includes an extension extending inward from the distal end of the second coupling section.

7. The wire-fixing device for a fan as claimed in claim 6, wherein the extension is planar.

8. The wire-fixing device for a fan as claimed in claim 6, wherein the extension is arcuate.

9. The wire-fixing device for a fan as claimed in claim 1, further comprising a wire outlet defined in a wall defining the wire groove, the wire groove being not in communication with either one of two end faces of the casing.

* * * * *